(12) United States Patent
Guthke et al.

(10) Patent No.: US 8,651,435 B2
(45) Date of Patent: Feb. 18, 2014

(54) DEVICE FOR MOUNTING SYSTEMS AND AIRCRAFT OR SPACECRAFT

(75) Inventors: Hans Peter Guthke, Buxtehude (DE); Barbara Lunitz, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 140 days.

(21) Appl. No.: 13/193,253

(22) Filed: Jul. 28, 2011

(65) Prior Publication Data

US 2012/0037763 A1 Feb. 16, 2012

Related U.S. Application Data

(60) Provisional application No. 61/372,313, filed on Aug. 10, 2010.

(30) Foreign Application Priority Data

Aug. 10, 2010 (DE) .......................... 10 2010 039 136

(51) Int. Cl.
*F16L 3/08* (2006.01)
*E04G 5/06* (2006.01)

(52) U.S. Cl.
USPC ........ 248/70; 248/72; 248/228.3; 248/231.41

(58) Field of Classification Search
USPC .............. 248/70, 72, 58, 228.1, 228.3, 230.1, 248/316.4, 323, 65, 67.7, 227.1, 231.41
See application file for complete search history.

(56) References Cited

U.S. PATENT DOCUMENTS

| 919,558 | A | * | 4/1909 | Doran | 248/72 |
| 2,877,974 | A | * | 3/1959 | Estes | 248/228.3 |
| 3,026,368 | A | | 3/1962 | Lindsey | |
| 3,053,494 | A | * | 9/1962 | Stoll | 248/228.3 |
| 3,437,743 | A | | 4/1969 | Lindsey | |
| 3,836,102 | A | | 9/1974 | Hall | |
| 4,073,563 | A | | 2/1978 | Bailey et al. | |
| 4,079,604 | A | * | 3/1978 | Anderegg | 70/58 |
| 4,171,861 | A | | 10/1979 | Hohorst | |

(Continued)

FOREIGN PATENT DOCUMENTS

| AT | 403 839 B | 8/2008 |
| DE | 902 482 B | 1/1954 |

(Continued)

OTHER PUBLICATIONS

Non-Final Office Action for U.S. Appl. No. 13/205,963 dated Oct. 19, 2012.

(Continued)

*Primary Examiner* — Tan Le
(74) *Attorney, Agent, or Firm* — Jenkins, Wilson, Taylor & Hunt, P.A.

(57) ABSTRACT

The present invention provides a device for mounting systems, for example an electrical or fluid-conveying line, on a structure, in particular of an aircraft or spacecraft, the device comprising: a basic holder which can be fastened to the structure; and at least a first system holder for mounting the systems; the basic holder being made up of at least a first part comprising a first interface for fastening the first system holder and a second part comprising a second interface for fastening the first or a second system holder, the interfaces being formed in an identical manner and pointing in different spatial directions.

9 Claims, 3 Drawing Sheets

(56) References Cited

U.S. PATENT DOCUMENTS

| | | | |
|---|---|---|---|
| 4,526,333 A | | 7/1985 | Nakama et al. |
| 4,580,754 A | * | 4/1986 | Hughes .................. 248/323 |
| 4,646,433 A | | 3/1987 | Le Houerou et al. |
| 5,112,015 A | * | 5/1992 | Williams .................. 248/236 |
| 5,305,978 A | | 4/1994 | Current |
| 5,378,171 A | | 1/1995 | Czerlanis |
| RE35,677 E | * | 12/1997 | O'Neill .................. 248/551 |
| 5,786,987 A | | 7/1998 | Barbier et al. |
| 5,836,786 A | | 11/1998 | Pepe |
| 6,161,803 A | | 12/2000 | Daoud |
| 6,516,498 B2 | | 2/2003 | LaCoy et al. |
| 6,547,587 B2 | | 4/2003 | Hurst et al. |
| 6,568,542 B1 | | 5/2003 | Chen |
| 6,666,340 B2 | | 12/2003 | Basinger et al. |
| 6,994,300 B2 | * | 2/2006 | Labeirie et al. .................. 248/70 |
| 7,238,105 B2 | | 7/2007 | Reinders |
| 7,534,958 B2 | | 5/2009 | McNutt et al. |
| 7,772,325 B2 | | 8/2010 | Ashiura et al. |
| 8,040,693 B2 | | 10/2011 | Blomquist |
| 8,141,826 B1 | | 3/2012 | Gallardo et al. |
| 8,534,614 B2 | | 9/2013 | Guthke et al. |
| 2008/0296443 A1 | | 12/2008 | Lunitz et al. |
| 2009/0065658 A1 | | 3/2009 | Chen et al. |
| 2011/0006169 A1 | | 1/2011 | Abbott |
| 2012/0037418 A1 | | 2/2012 | Zyrull et al. |
| 2012/0037756 A1 | | 2/2012 | Guthke et al. |
| 2012/0037765 A1 | | 2/2012 | Guthke et al. |

FOREIGN PATENT DOCUMENTS

| | | |
|---|---|---|
| DE | 86 20 533 U1 | 11/1986 |
| DE | 297 18 147 U1 | 2/1998 |
| DE | 20 2005 011 492 U1 | 12/2005 |
| DE | 10 2006 015 700 A1 | 11/2006 |
| DE | 10 2007 060 039 | 6/2008 |
| DE | 10 2007 060 030 A1 | 12/2008 |
| DE | 20 2008 011 723 | 12/2008 |
| EP | 0627587 A1 | 12/1994 |

OTHER PUBLICATIONS

German Office Action for German Application No. 10 2010 039 136.0 dated Oct. 15, 2010.

German Office Action for German Application No. 10 2010 039 133.6 dated Mar. 22, 2011.

German Office Action for German Application No. 10 2010 039 134.4 dated Apr. 1, 2011.

German Office Action for German Application No. 10 2010 039 135.2 dated Apr. 1, 2011.

Final Office Action for U.S. Appl. No. 13/205,963 dated Feb. 21, 2013.

Non-Final Office Action for U.S. Appl. No. 13/205,174 dated Apr. 18, 2013.

Restriction Requirement for U.S. Appl. No. 13/193,269 dated Apr. 30, 2013.

Notice of Allowance for U.S. Appl. No. 13/205,963 dated May 15, 2013.

Non-Final Office Action for U.S. Appl. No. 13/193,269 dated Jun. 26, 2013.

Final Office Action for U.S. Appl. No. 13/205,174 dated Aug. 6, 2013.

* cited by examiner

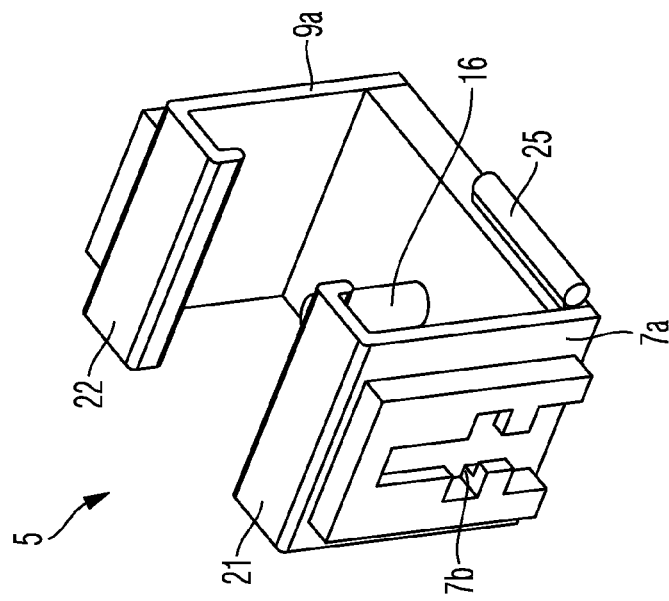
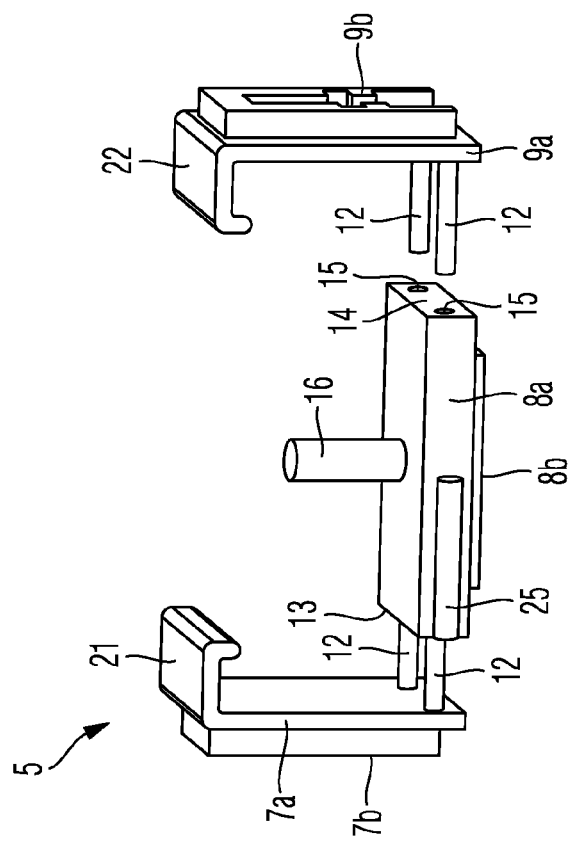

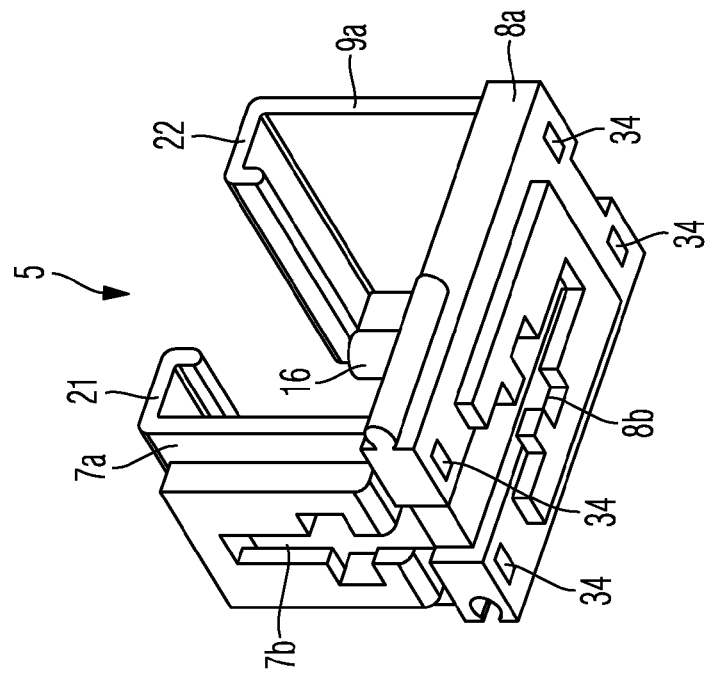
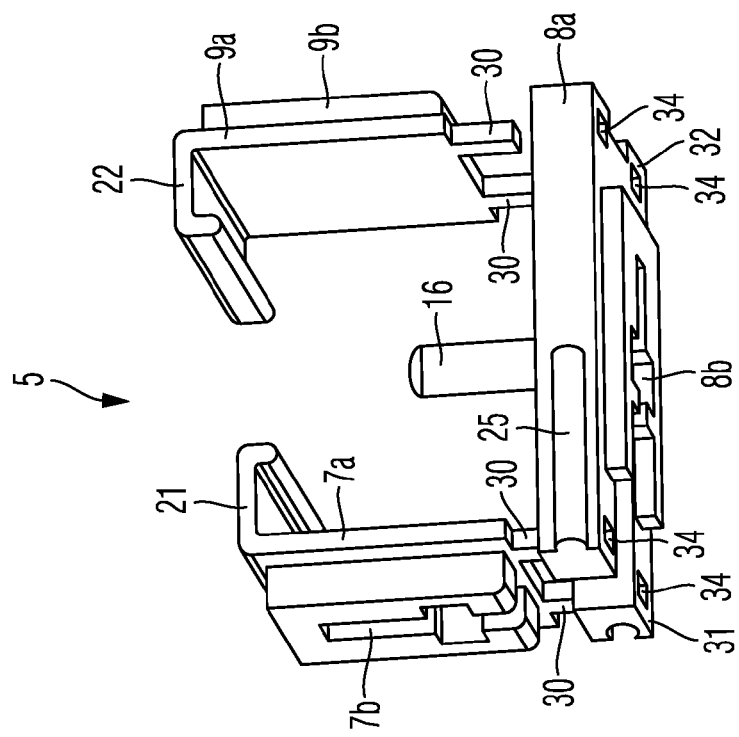

DEVICE FOR MOUNTING SYSTEMS AND AIRCRAFT OR SPACECRAFT

CROSS-REFERENCE TO RELATED APPLICATIONS

This application claims the benefit of and priority to U.S. Provisional Application No. 61/372,313 filed Aug. 10, 2010 and German patent application No. 10 2010 039 136.0 filed Aug. 10, 2010, the entire disclosures of which are herein incorporated by reference.

FIELD OF THE INVENTION

The present invention relates to a device for mounting systems and to an aircraft or spacecraft.

BACKGROUND OF THE INVENTION

Although they can be applied to any systems and any aircraft or spacecraft, the present invention and the problem on which it is based will be described in detail in relation to an electrical line in a passenger aircraft.

In a modern passenger aircraft, a large number of electrical components must be interconnected by means of electrical lines. If a distance between two electrical components to be connected exceeds a particular value, it is necessary, in particular for reasons of safety and order, to mount the electrical line provided for connection of the electrical components along its route between the electrical components. In this case, the mounting is generally carried out on a substructure of the passenger aircraft by means of a device.

DE 10 2007 060 030 A1, for example, describes a device of this type which also exhibits the features of the preamble of claim 1.

The device described in DE 10 2007 060 030 A1 for mounting systems has the drawback that the system holder for mounting the systems can only be fastened to the basic holder in one orientation. This drawback occurs for example when, after installation of the device in the aircraft, it is decided that a line should extend in a spatial direction other than that originally planned, or else a plurality of lines which extend in different spatial directions are to be held by means of the device.

SUMMARY OF THE INVENTION

Accordingly, a device for mounting systems, for example an electrical or fluid-conveying line, on a structure, in particular of an aircraft or spacecraft, is provided which comprises the following: a basic holder which is fastenable to the structure; and at least a first system holder for mounting the systems; the basic holder comprising at least a first part comprising a first interface for fastening the first system holder and a second part comprising a second interface for fastening the first or a second system holder, the interfaces being formed in an identical manner and pointing in different spatial directions.

Furthermore, an aircraft or spacecraft is provided which comprises the following: a structure; a system; and the device according to the invention, which is fastened to the structure and holds the system relative to the structure.

The idea underlying the present invention is to provide a basic holder comprising two interfaces which are formed in an identical manner and point in different spatial directions. The system holder can thus be fastened to the first or the second interface as required, in order to thus deal with a modified course of a system, for example a line. It is also possible to attach a first system holder to the first interface and a second system holder to the second interface. It is thus possible, by means of the device, to hold systems which extend in different spatial directions.

Advantageous configurations and developments of the invention will emerge from the dependent claims.

According to a preferred development of the device according to the invention, the basic holder comprises a third part which, together with the first and second parts, forms a U shape. The first and second interfaces can thus be provided in a simple manner, in such a way that these point in spatial directions which are offset from one another by 90° or 180°.

According to a further preferred development of the device according to the invention, the third part comprises a third interface for fastening the first, second or a third system holder, which third interface is formed in an identical manner to the first and second interfaces and points in a third spatial direction. This provides the possibility of optionally attaching the system holder to one of three interfaces which point in spatial directions offset from one another by 90° in each case. Obviously it is also possible to attach a first system holder to the first interface, a second system holder to the second interface and a third system holder to the third interface, the three system holders then being oriented in three different spatial directions.

According to a further preferred development of the device according to the invention, the interfaces are arranged on the outside of the U shape. This makes the respective interfaces easily accessible.

According to a further preferred development of the device according to the invention, hooks for engaging from behind a structure formed as a conduit are formed on the free ends of the U shape, the first and third parts each resting against a flange of the conduit and the second part resting against a web of the conduit when the basic holder is fastened to the conduit. This makes it easy to fasten the basic holder to the conduit. Moreover, the basic holder becomes comparatively rigid as a result of this type of fastening to the conduit.

According to a further preferred development of the device according to the invention, the hooks are designed to snap resiliently over the free ends of the flanges of the conduit. As a result, the U-shaped basic holder can be slipped easily onto the conduit at right angles to the longitudinal direction thereof, the hooks then automatically engaging with the conduit.

According to a further preferred development of the device according to the invention, the first and/or third part comprises at least one pin which is received in the second part such that it can slide in the main extension plane thereof. As a result, the first, second and third parts can be fastened to one another in a simple manner.

According to a further preferred development of the device according to the invention, the first and/or third part comprises at least one pin which is received in the second part such that it can slide perpendicular to the main extension plane thereof, means for fixing the first and/or third part relative to the second part being provided. For example, the fixing means may be locking elements and corresponding mating locking elements. In particular, a clip which matches a corresponding opening is considered.

According to a further preferred development of the device according to the invention, the second part comprises a further pin which extends substantially perpendicular to the main extension plane of the second part and is formed for engagement in a recess in the structure. As a result, the basic holder can be secured in a simple manner against a movement in the longitudinal direction of the conduit relative thereto.

The basic holder can be linked to other basic holders, in particular in a releasable manner, as described in DE 10 2007 060 030 A1.

BRIEF DESCRIPTION OF THE DRAWINGS

In the following, the invention will be described in further detail by way of embodiments with reference to the accompanying figures of the drawings, in which:

FIG. 2A is a perspective view of the basic holder of FIG. 1 in a disassembled state;

FIG. 2B is a perspective view of the basic holder of FIG. 2A in an assembled state;

FIG. 3A is a perspective view of a basic holder according to a further embodiment of the present invention, said basic holder being in a disassembled state; and FIG. 3B is a perspective view of the basic holder of FIG. 3A in an assembled state.

In the figures, like reference numerals denote like or functionally equivalent components unless indicated otherwise.

DETAILED DESCRIPTION OF THE INVENTION

Figure 1:
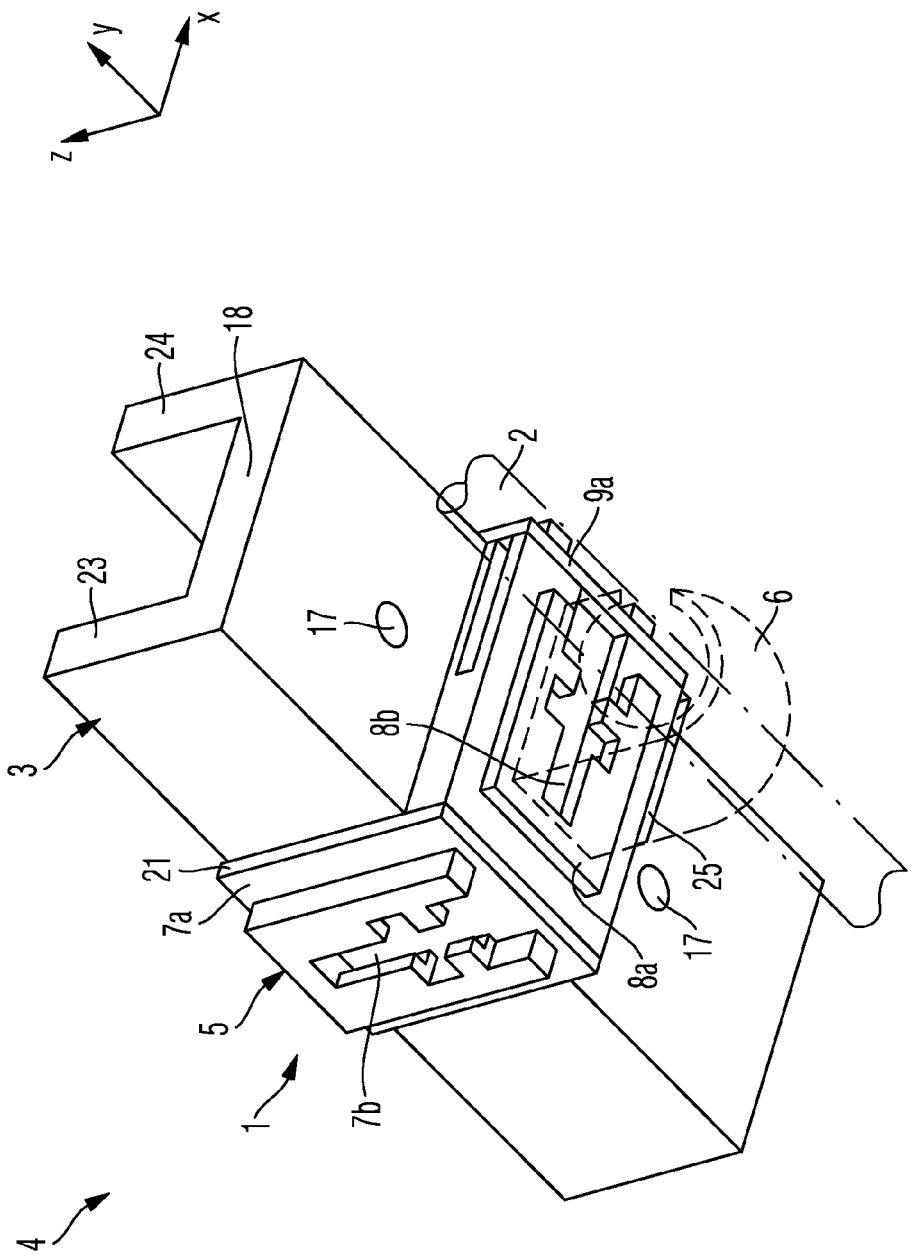
FIG. 1 is a perspective view of a device according to an embodiment of the present invention, which device is fastened to a conduit of an aircraft.

FIG. 1 is a perspective view of a device 1 according to an embodiment of the present invention. FIG. 2A is a perspective view of a basic holder 5 of the device 1 of FIG. 1 in a disassembled state, and FIG. 2B is a perspective view of the basic holder 5 of FIG. 2A in an assembled state.

The device 1 is formed for mounting systems, for example an electrical line 2 which is shown as a dashed line in FIG. 1. The device 1 holds the line 2 on a structure formed as a conduit 3, for example a U-shaped conduit. The conduit 4 forms part of an aircraft which, as a whole, is denoted by reference numeral 4.

The device 1 comprises the basic holder 5, which can be releasably fastened to the conduit 3. FIG. 1 shows the basic holder 5 when attached to the conduit 3.

The device 1 further comprises one or more system holders 6. FIG. 1 merely shows a system holder of this type as a dashed line. The system holder 6 holds the line 2.

Typically, a plurality of the devices 1 are provided, which, spaced apart from one another, hold the line 2 at a plurality of points on its route through the aircraft 4.

The basic holder 5 is made up of a first part 7a having a first interface 7b, a second part 8a having a second interface 8b and a third part 9a (see FIG. 2A) having a third interface 9b.

The interfaces 7b, 8b, 9b are formed in an identical manner and are designed so that the system holder 6 can be releasably fastened thereto. With reference to FIG. 1, for example, the interfaces 7b, 8b, 9b each have a suitable shape which allows such a releasable fastening of the system holder 6. The shapes of the interfaces 7b, 8b, 9b match a corresponding shape of the system holder 6.

The interfaces 7b, 8b, 9b point in different spatial directions. According to the present invention, this is achieved by arranging the parts 7a, 8a and 9a in a U shape.

For better clarity, FIG. 1 shows a coordinate system, the X-direction pointing in the longitudinal direction of the aircraft 4, the Y-direction pointing in the transverse direction of the aircraft 4 and the Z-direction pointing in the vertical direction of the aircraft 4. Merely by way of example, in the present case the Y-direction coincides with the longitudinal direction of the conduit 3.

It thus emerges from FIG. 1 that the first interface 7b points in the opposite direction to the X-direction, the second interface 8b points in the opposite direction to the Z-direction and the third interface 9b points in the opposite direction to the X-direction. Consequently, the interfaces 7b, 8b, 9b point in spatial directions which are offset from one another by 90° in each case.

In FIG. 1, the system holder 6 is releasably fastened to the second interface 8b. If it is then desired to orientate the line 2 differently, the system holder 6 can be releasably fastened to the first interface 7b or else to the third interface 9b.

It is also possible to provide a further system holder (not shown) in addition to the system holder 6 shown in FIG. 1, said further system holder being releasably fastened to the first interface 7b, for example, and holding a further line (not shown).

Yet another system holder (not shown) could also be releasably fastened, together with a corresponding line, to the third interface 9b.

The first, second and third parts 7a, 8a, 9a are each preferably formed substantially as rectangular plate elements. The first, second and third parts 7a, 8a, 9a can consist of one piece, i.e. forming a unitary conduit portion for example, or, as shown in FIG. 2A, can be formed separately, i.e. not in one piece. The interfaces 7b, 8b, 9b can for example be glued to the parts 7a, 8b, 9b or else integrated into the parts 7a, 8a, 9a in one piece.

With further reference to FIG. 2A, the first and third parts 7a, 9a each comprise two pins 12. The second part 8a is provided, on each of the opposing end faces 13, 14 thereof, with two holes 15 which extend substantially in the main extension plane of the second part 8a.

In order to assemble the basic holder 5 and fasten it to the conduit 3, the second part 8a is firstly positioned on the conduit 3 in such a way that said second part rests against a web 18 of the conduit 3 and a pin 16, integrally formed on the second part 8a, extends through one of preferably a plurality of holes 17 in the conduit 3. The two pins 12 of the first part 7a are then inserted into the holes 15 in the end face 13 of the second part 8a and the pins 12 of the third part 9a are inserted into the holes 15 in the end face 14 of the second part 8a. If the first part 7a and the third part 9a are then slid completely onto the second part 8a in and counter to the X-direction respectively, hooks 21, 22 formed on the first part 7a and the third part 9a each snap over a free end of a flange 23, 24 of the conduit 3 (see FIG. 1). The hooks 21, 22 are formed resiliently for this purpose.

The hooks 21, 22 then engage the free ends of the flanges 23 and 24 from behind in such a way that positive locking is provided in the Z-direction. Furthermore, the first part 7a rests against the flange 23 and the third part 9a rests against the flange 24, in such a way that there is positive locking in the X-direction. The pin 16 provides positive locking in the X- and Y-directions. The basic holder 5 is thus fixed in all three spatial directions X, Y and Z.

The basic holder 5 can further comprise one or more means 25 for linking it, in particular in the Y-direction, to further, in particular identically formed, basic holders 5, as described in DE 10 2007 060 030 A1 for example.

FIG. 3A is a perspective view of a basic holder 5 of a device according to a further embodiment of the present invention, said basic holder being in a disassembled state, and FIG. 3B is a perspective view of the basic holder of FIG. 3A in an assembled state.

In the following, only the differences with respect to the embodiments of FIG. 1, 2A and 2B will be discussed.

The first part 7a and the third part 9a each comprise two pins 30. The second part 8a comprises, on the opposing ends 31 and 32 thereof, recesses 34 which are each designed to receive one of the pins 30. According to the present embodiment, the recesses 34 have, for example, a square cross-section and extend substantially perpendicular to the main extension plane of the second part 8a.

Provided in the recesses 34 are locking means (not shown) which match corresponding mating locking means (not shown) on the pins 30. For example, a respective tongue (not shown) can be provided in the region of the recesses 34, which tongue engages with a corresponding locking element (not shown) on a respective pin 30 when the pin 30 is inserted into the recess 34.

In the embodiment according to FIG. 3A and 3B, the hooks 21 and 22 are formed so as to be rigid, i.e. not resilient.

In order to assemble the basic holder 5 according to FIG. 3A and 3B and fasten it to the conduit 3 (see FIG. 1), the second part 8a is firstly positioned on the conduit 3 in such a way that said second part rests against the web 18 of the conduit 3 and the pin 16 extends through one of the plurality of holes 17 in the conduit 3. The first and third parts 7a, 9a are then slid counter to the Z-direction, i.e. downwards in FIG. 1, onto the second part 8a, the pins 30 sliding into the recesses 34 and the locking means mentioned engaging with the mating locking means. The hooks 21 and 22 then engage the free ends of the flanges 23 and 24 of the conduit respectively from behind, as described above for the embodiment according to FIG. 1, 2A and 2B. Thus, in the embodiment according to FIG. 3A and 3B, too, the basic holder 5 is fastened in all three spatial directions X, Y and Z with respect to the conduit 3.

Although the invention has been described herein with reference to preferred embodiments, it is in no way limited thereto, but can be modified in a variety of ways. In particular, the developments and embodiments described herein for the device according to the invention can be applied accordingly to the aircraft or spacecraft according to the invention. It should also be noted that where "a/an" is used herein this does not exclude a plurality.

The invention claimed is:

1. Device for mounting systems on a structure comprising:
   a basic holder which is fasteneable to the structure; and
   at least a first system holder for mounting the systems;
   wherein the basic holder comprises:
      a first part comprising a first interface for fastening the first system holder;
      a second part comprising a second interface for fastening a second system holder; and
      a third part which, together with the first and second parts, forms a U shape and comprises a third interface for fastening a third system holder;
   wherein the interfaces are arranged on the outside of the U shape of the basic holder, the interfaces being formed in an identical manner and pointing in different spatial directions such that the first, second or third system holders or a combination thereof can be arranged to the basic holder to hold systems which extend in different spatial dimensions; and
   wherein the first and/or third part comprises at least one pin which is received in the second part such that it can slide perpendicular to the main extension plane thereof, means for fixing the first and/or third part relative to the second part being provided.

2. Device for mounting systems on a structure comprising:
   a basic holder which is fasteneable to the structure; and
   at least a first system holder for mounting the systems;
   wherein the basic holder comprises:
      a first part comprising a first interface for fastening the first system holder;
      a second part comprising a second interface for fastening a second system holder; and
      a third part which, together with the first and second parts, forms a U shape and comprises a third interface for fastening a third system holder;
   wherein the interfaces are arranged on the outside of the U shape of the basic holder, the interfaces being formed in an identical manner and pointing in different spatial directions such that the first, second or third system holders or a combination thereof can be arranged to the basic holder to hold systems which extend in different spatial dimensions; and
   wherein the second part comprises a further pin which extends substantially perpendicular to the main extension plane of the second part and is formed for engagement in a recess in the structure.

3. Aircraft or spacecraft, comprising: a structure, a system; and a device for mounting systems on a structure, which is fastened to the structure and holds the system relative to the structure, the device comprising:
   a basic holder which is fasteneable to the structure; and
   at least a first system holder for mounting the systems;
   wherein the basic holder comprises:
      a first part comprising a first interface for fastening the first system holder;
      a second part comprising a second interface for fastening a second system holder; and
      a third part which, together with the first and second parts, forms a U shape and comprises a third interface for fastening a third system holder;
   wherein the interfaces are arranged on the outside of the U shape of the basic holder, the interfaces being formed in an identical manner and pointing in different spatial directions such that the first, second or third system holders or a combination thereof can be arranged to the basic holder to hold systems which extend in different spatial dimensions.

4. Mounting arrangement for mounting systems comprising:
   a structure formed as a conduit;
   at least a first system holder for mounting the systems; and
   a basic holder which is fasteneable to the structure, wherein the basic holder comprises:
      a first part comprising a first interface for fastening the first system holder;
      a second part comprising a second interface for fastening a second system holder; and
      a third part which, together with the first and second parts, forms a U shape and comprises a third interface for fastening a third system holder;
   wherein the interfaces are arranged on the outside of the U shape of the basic holder, the interfaces being formed in an identical manner and pointing in different spatial directions such that the first, second or third system holders or a combination thereof can be arranged to the basic holder to hold systems which extend in different spatial dimensions; and
   wherein hooks for engaging from behind the conduit are formed on the free ends of the U shape of the basic holder, the first and third parts each resting against a flange of the conduit and the second part resting against a web of the conduit when the basic holder is fastened to the conduit.

5. Mounting arrangement according to claim 4 wherein the hooks are designed to snap resiliently over the free ends of the flanges of the conduit.

6. Mounting arrangement according to claim 5, wherein the first and/or third part comprises at least one pin which is received in the second part such that it can slide in the main extension plane thereof.

7. Mounting arrangement according to claim 4, wherein the first and/or third part comprises at least one pin which is received in the second part such that it can slide perpendicular to the main extension plane thereof, means for fixing the first and/or third part relative to the second part being provided.

8. Mounting arrangement according to claim 4, wherein the second part comprises a further pin which extends substantially perpendicular to the main extension plane of the second part and is formed for engagement in a recess in the structure.

9. Aircraft or spacecraft, comprising a mounting arrangement according to claim 4, which holds the system relative to the structure.

* * * * *